(12) United States Patent
Sands et al.

(10) Patent No.: US 6,789,465 B2
(45) Date of Patent: Sep. 14, 2004

(54) GRILLING SURFACE

(75) Inventors: Jeffrey L. Sands, Freeport, IL (US); Ronald J. Glavan, Rockton, IL (US)

(73) Assignee: Carrier Commercial Refrigeration, Inc., Syracuse, NY (US)

( * ) Notice: Subject to any disclaimer, the term of this patent is extended or adjusted under 35 U.S.C. 154(b) by 0 days.

(21) Appl. No.: 10/124,756

(22) Filed: Apr. 17, 2002

(65) Prior Publication Data

US 2003/0196560 A1 Oct. 23, 2003

(51) Int. Cl.$^7$ .............................................. A47J 37/10
(52) U.S. Cl. ........................ 99/423; 99/386; 126/390.1
(58) Field of Search ........................ 99/422, 423, 386, 99/391, 451; 126/390.1; 220/573.2, 573.1

(56) References Cited

U.S. PATENT DOCUMENTS

| | | | |
|---|---|---|---|
| 3,659,517 A | | 5/1972 | Holen |
| 4,482,426 A | | 11/1984 | Maynard et al. |
| 4,516,486 A | * | 5/1985 | Burkhart .................. 99/422 X |
| 5,044,264 A | | 9/1991 | Forney |
| 5,227,597 A | * | 7/1993 | Dickens et al. ........... 99/451 X |
| 5,259,299 A | | 11/1993 | Ferraro |
| 5,524,528 A | | 6/1996 | Yeh |
| 5,549,040 A | | 8/1996 | Naramura |
| 5,588,354 A | * | 12/1996 | Stuck et al. .................. 99/386 |
| 6,267,047 B1 | * | 7/2001 | Mosher, II et al. ........ 99/422 X |
| 6,443,052 B1 | * | 9/2002 | Garber et al. .............. 99/422 X |
| 2002/0005122 A1 | * | 1/2002 | Schultheis .................... 99/422 |

FOREIGN PATENT DOCUMENTS

| | | | |
|---|---|---|---|
| DE | 19920493 | * | 5/1999 |

* cited by examiner

*Primary Examiner*—Reginald L. Alexander
(74) *Attorney, Agent, or Firm*—Carlson, Gaskey & Olds

(57) ABSTRACT

A grilling component employed to grill food items includes a grilling surface made of a material having a low constant of thermal expansion. In one example, the grilling surface is made of Invar™. Invar™ is a metal allow comprised of Iron and 36% Nickel, and may include other trace elements. Invar has a low constant of thermal expansion and therefore moves and expands very little when heated. The grilling surface further includes a non-stick coating, such as Teflon™. The grilling surface can also be a conveyor belt which travels over a heater.

13 Claims, 1 Drawing Sheet

GRILLING SURFACE

BACKGROUND OF THE INVENTION

The present invention relates generally to a grilling surface having a low constant of thermal expansion employed to cook food.

Grills or griddles are used to cook various foods, such as hamburgers. In one prior grill, the sides of the food are grilled separately. The food is placed on a flat grill portion, grilling the side of the food that contacts the flat grill portion. After that side of the food is cooked, the food is manually flipped to allow cooking the opposite side. After the food is cooked, the food is manually removed from the grill for serving.

In another prior grill, both sides of the food are grilled simultaneously. After programming the type of food into a control unit, the food is placed on a lower grill portion. A platen having an upper grill portion is then lowered over the food, positioning the food between the upper and lower grill portions and grilling the food simultaneously on both sides. After lowering the platen, the distance between the upper and lower grill portions is automatically adjusted according to the type of food which is programmed into the control unit. After a predetermined amount of time has passed, the platen raises, and the food is manually removed from the grill.

Conveyor belts that travel over a heater have also been used to grill foods. As an item of food travels over the heater on the conveyor belt, the item of food is cooked.

The material of the grilling surface is commonly stainless steel. A drawback to employing stainless steel is that as it has a high constant of thermal expansion, it tends to expand and lift from the items of food. When this occurs, the food may not be fully cooked. It would be beneficial to employ grilling surface of a material having a low constant of thermal expansion.

SUMMARY OF THE INVENTION

A grilling component employed to grill food includes a heater and a grilling surface made of a material having a low constant of thermal expansion. In one example, the grilling surface is made of Invar™. Invar™ is a metal allow comprised of Iron and 36% Nickel, and may include other trace elements. Invar has a low constant of thermal expansion and therefore moves and expands very little when heater. The grilling surface further includes a non-stick coating, such as Teflon™.

The grilling surface can be a conveyor belt positioned around a grilling structure of the grilling component. The grilling component further includes a heater, a drive pulley, and a non-drive pulley. The drive pulley is powered by a drive motor to move the conveyor belt around the grilling structure, creating a surface that travels over the heater. As the food items travel on the conveyor belt over the heater, the food items are cooked.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
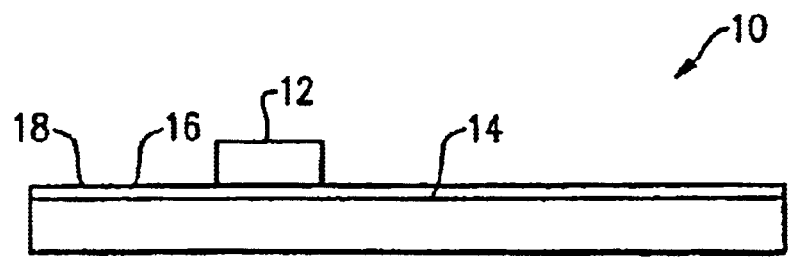
FIG. 1 schematically illustrates a grilling component.

FIG. 1 schematically illustrates a grilling component 10 employed to grill food items 12, such as hamburger patties. The grilling component 10 includes a heater 14 to cook the food items 12 and a grilling surface 16 made of a suitable material having a low constant of thermal expansion. A further shown in FIG. 1, the surface of the grilling surface 16 is substantially flat.

In one example, the grilling surface 16 is made of Invar™ commercially available from Imphy S. A. Corporation of Paris, France. Invar™ is a metal alloy comprised of Iron and 36% Nickel, and may include other trace elements. Invar has a low constant of thermal expansion and therefore moves and expands very little when heater. Although Invar™ has been disclosed, it is to be understood that other suitable materials having a low constant of thermal expansion can be used.

The grilling surface 16 further includes a non-stick coating 18. In one example, the non-stick coating 18 is Teflon™ commercially available from E. I. DuPont Nemours and Company Corporation of Wilmington, Del. However, other suitable materials can be used as the non-stick coating 18.

Figure 2:
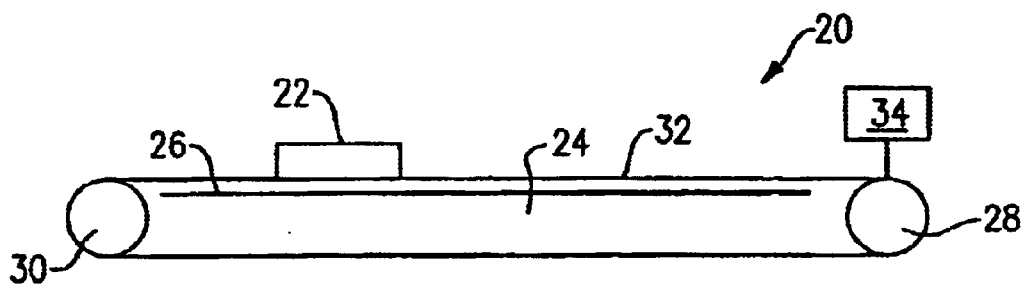
FIG. 2 schematically illustrates a grilling component employing a conveyor belt as the grilling surface.

FIG. 2 illustrates an alternative grilling component 20 employing a conveyor belt 32 as the grilling surface The grilling conveyor belt 32 is positioned around a grilling structure 24, a heater 26, a drive pulley 28, and a non-drive pulley 30. In one example, the heater 26 is an electric resistance heater at a temperature of 400° C. The drive pulley 28 is powered by a drive motor 34 to move the conveyor belt 32 around the grilling structure 24, creating a surface that travels over the heater 26. As the food items 22 travel on the conveyor belt 32 over the heater 26, the food items 22 are cooked.

The conveyor belt 32 is made of any suitable material having a low constant of thermal expansion, such as Invar™. The conveyor belt 32 further includes a non-stick coating 36, such as Teflon™ As known, Teflon is a non-stick fluorine containing polymer.

Figure 3:
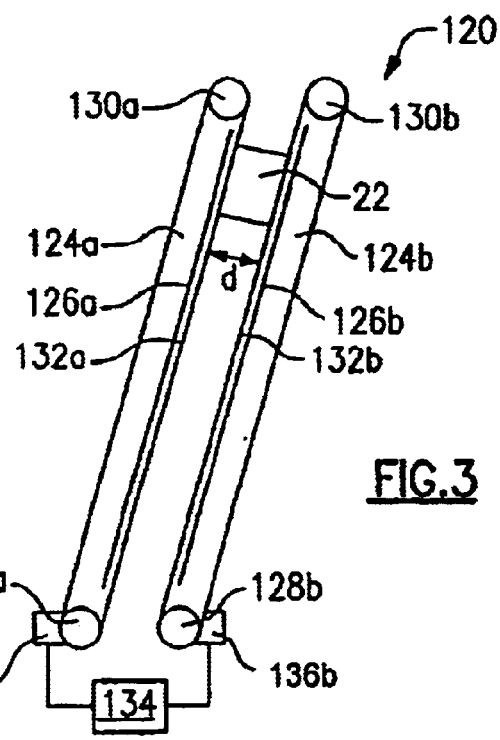
FIG. 3 schematically illustrates a grilling component including a pair of conveyor belts as the grilling surface.

FIG. 3 schematically illustrates an alternative grilling component 120 including a pair of grilling components 124a and 124b separated by a gap d. Each grilling component 124a and 124b includes a heater 126a and 126b, a drive pulley 128a and 128b, a non-drive pulley 130a and 130b, and a conveyor belt 132a and 132b positioned around each of the grilling components 124a and 124b. The drive pulleys 128a and 128b are powered by a respective drive motor 136a and 136b, creating a surface that travels over the heaters 126a and 126b. A drive controller 134 provides a control signal to the drive motors 136a and 136b to synchronize the speed of the conveyor belts 132a and 132b. The food items 22 are grilled by passing the food items 22 in the gap d while food items 22 travel between the conveyor belts 132a and 132b. As the food items 22 are squeezed within the gap d, the food items 22 do not slip between the conveyor belts 132a and 132.

The grilling surface of the present invention can be used with an automated grill, such as described in co-pending patent application serial No. 10/124,629 entitled "Automated Grill" filed on Apr. 17, 2002.

There are several advantages to utilizing a grilling surface of Invar™. For one, as Invar™ has a low constant of thermal expansion, it expands or moves very little when heated. Therefore, it will not lift from the food items during cooking, improving the overall cooking of the food items.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A grilling component comprising an endless member comprised of a nickel iron alloy, and said endless member is a conveyor belt.

2. The grilling component as recited in claim 1 wherein said nickel iron alloy includes approximately 36% nickel.

3. The grilling component as recited in claim 1 further including a heater.

4. A grilling component comprising:
   a grilling surface comprised of a nickel iron alloy including approximately 36% nickel, and said grilling surface is an endless member;
   a non stick coating on said grilling surface; and
   a motor to drive said endless member over a heater.

5. The grilling structure as recited in claim 4 wherein said grilling surface is a conveyor belt.

6. The grilling component as recited in claim 4 wherein said grilling component further includes a first grilling component having said grilling surface and a second grilling component having said grilling surface, and said first grilling component and said second grilling component are separated by a gap.

7. The grilling component as recited in claim 4 wherein said non-stick coating is a fluorine containing polymer.

8. The grilling component as recited in claim 4 wherein said grilling surface is substantially flat.

9. A grilling component comprising:
   a grilling surface comprised of a nickel iron alloy including approximately 36% nickel, and said grilling surface is a conveyor belt; and
   a non-stick coating on said grilling surface.

10. The grilling component as recited in claim 9, wherein said non-stick coating is a fluorine containing polymer.

11. The grilling component as recited in claim 9 further including a heater to heat said grilling surface.

12. The grilling component as recited in claim 9 further including a motor to drive said conveyor belt over a heater.

13. The grilling component as recited in claim 9 wherein said grilling surface is substantially flat.

* * * * *